US005334850A

United States Patent [19]
Ashida

[11] Patent Number: 5,334,850
[45] Date of Patent: Aug. 2, 1994

[54] METHOD AND DEVICE FOR OPTICALLY DETECTING AN INTERFACE BETWEEN TWO FLUIDS AND METHOD OF SETTING THE PARAMETERS FOR SUCH DETECTION

[75] Inventor: Keiji Ashida, Kashiwa, Japan

[73] Assignee: Sumitomo Chemical Co., Ltd., Osaka, Japan

[21] Appl. No.: 961,326

[22] Filed: Oct. 15, 1992

[30] Foreign Application Priority Data

Oct. 17, 1991 [JP] Japan ................... 3-269430

[51] Int. Cl.$^5$ ............................................. G01N 15/06
[52] U.S. Cl. ................... 250/577; 250/227.23; 356/440
[58] Field of Search ............... 250/576, 577, 227.23, 250/227.24, 227.25, 226, 901–903; 356/436, 440, 409–411; 73/293

[56] References Cited

U.S. PATENT DOCUMENTS

| | | | |
|---|---|---|---|
| 4,045,668 | 8/1977 | Pitt et al. | 250/227.25 |
| 4,544,840 | 10/1985 | Keller | 250/227.25 |
| 4,637,729 | 1/1987 | Schoch | 250/227.25 |
| 5,164,608 | 11/1992 | Vali et al. | 250/577 |
| 5,208,465 | 5/1993 | Jacobson | 250/573 |

FOREIGN PATENT DOCUMENTS 51-55260   5/1976   Japan .
53-146490  12/1978  Japan .

*Primary Examiner*—David C. Nelms
*Assistant Examiner*—S. B. Allen

[57] ABSTRACT

An interface between a first fluid and a second fluid to be detected passes through a light transmitting unit. A light source unit supplies light to the light transmitting unit through an optical fiber. A light detecting unit detects an intensity of the light from the light source unit through the light transmitting unit. A deflection of an output of the intensity of the light detecting unit is monitored to detect the passage of the interface of the first and the second fluids. In the device according to this invention, based on a difference in light transmission characteristics between the first and the second fluids, a spectral intensity of the light source unit, characteristics of an optical path from the light source unit to the light detecting unit, and spectral detection sensitivity characteristics of the light detecting unit are suitably selected, so that a difference in an output of the detecting unit detectably exceeds a set value when the interface of the two fluids passes through the light transmitting unit. Consequently the passage of the interface between the two fluids can be detected with high precision.

50 Claims, 20 Drawing Sheets

METHOD AND DEVICE FOR OPTICALLY DETECTING AN INTERFACE BETWEEN TWO FLUIDS AND METHOD OF SETTING THE PARAMETERS FOR SUCH DETECTION

BACKGROUND OF THE INVENTION

1. Field of the Invention

This invention relates to a method and device for detecting an interface, which is installed in a vessel, such as a storage tank storing two kinds of fluids, a reaction vessel or others, or a pipe or others connected to the vessel for drawing the fluids.

2. Related Background Art

FIG. 1 shows one example of the conventional interface detecting device. A light source unit 604 and a light detecting unit 606 are opposed to each other across a pipe 602 for drawing liquids connected to the bottom of a vessel 600. The parts of the side of the pipe corresponding to the light source unit 604 and the light detecting unit 606 are made of transparent members so that the light detecting unit 606 detects a beam from the light source unit 604. A constant amount of light is emitted from the light source unit 604. When an interface 608 between an upper liquid and a lower liquid passes between the light source unit 604 and the light detecting unit 606, an output of the light detecting unit 606 deflects, and, based on this deflection, the passage of the interface can be detected.

But in the above-described interface detecting device, some kinds of liquids do not transmit sufficient light amounts to be detected by the light detecting unit when they pass through the vessel or the pipe, and in some cases an interface between an upper and a lower liquids cannot be detected. Especially in the case that both upper and lower liquids have low light transmissions when they pass through the vessel or the pipe, their interface cannot be sufficiently sensed, and the passage of their interface cannot be sufficiently detected.

In some cases, a difference in light transmission between the upper and the lower liquids is so small that a deflection or change in a detected light amount by the light detecting unit is small, with the result that the passage of the interface cannot be fully detected. That is, liquids do not have always the same light transmission. Every moment their light transmissions slightly vary. Their detected light amounts accordingly vary, and contain noise. Thus, to accurately detect an interface between an upper and a lower liquid, a sufficient difference in light transmission between the upper and the lower liquids, i.e., between detected light amounts through the respective liquids, is required. Some kinds of liquids do not make sufficient differences therebetween in the detected light amount.

SUMMARY OF THE INVENTION

An object of this invention is to provide a method and device for detecting an interface between liquids or others which can detect the passage of the interface on conditions optimum for kinds of the liquids passing through a vessel or a pipe.

To solve the above-described problems, according to the method for detecting an interface of this invention, a spectral intensity of a light source unit, characteristics of an optical path from the light source unit to a detecting unit, and spectral detection sensitivity characteristics of the detecting unit are selected in accordance with light transmission characteristics of a first fluid and a second fluid passing through a light transmitting unit provided between the light source unit and the detecting unit so that a difference in an output of the detecting unit between when the first fluid is in the optical path in the light transmitting unit and when the second fluid is in the optical path in the light transmitting unit exceeds a set value to monitor a deflection of the output of the detecting unit, whereby the passage of the interface between the first and the second fluids through the light transmitting unit can be detected.

The device for detecting an interface according to this invention comprises a light transmitting unit for a first and a second fluids to pass through; a light source unit for supplying light to the light transmitting unit; a detecting unit for detecting an intensity of the light from the light source unit which has passed through the light transmitting unit, whereby a deflection of an output of the detecting unit is monitored to detect the passage of the interface between the first and the second fluids through the light transmitting unit. To this end, a spectral intensity of the light source unit, characteristics of an optical path from the light source unit to the detecting unit, and spectral detection sensitivity characteristics of the detecting unit are selected in accordance with characteristics of the light transmission of the first and the second fluids so that a difference in an output of the detecting unit between when the first fluid is in the optical path of the light transmitting unit and when the second fluid is in the optical path of the light transmitting unit.

In the method and device for detecting an interface, a spectral intensity of the light source unit, characteristics of the optical path from the light source unit to the detecting unit, and spectral detection sensitivity characteristics of the detecting unit are selected in accordance with light transmission characteristics of a first fluid and a second fluid passing through the light transmitting unit provided between the light source unit and the detecting unit. Consequently a difference in an output of the detecting unit exceeds a set value when the interface of the two fluids passes through the light transmitting unit. By monitoring a deflection of an output of the detecting unit, the passage of the interface between the first and the second fluids can be detected with high precision.

In the above-described method and device for detecting an interface, by selecting a spectral intensity of the light source unit, characteristics of an optical path from the light source unit to the detecting unit, and spectral detection sensitivity characteristics of the detecting unit in accordance with light transmission characteristics of the first and the second fluids, light to be used in the detection of the interface between the fluids can be limited to a given wavelength band. Consequently a difference in light transmission between the two fluids can be effectively augmented, and the precision of the interface detection can be improved.

In the above-described method and device for detecting the interface between the fluids, light transmitted distances through the fluids along the optical path from the light source unit to the detecting unit in the light transmitting unit can be set corresponding to light transmitting characteristics of the first and the second fluids, a spectral intensity of the light source unit, an optical path from the light source unit to the detecting unit, and spectral detection sensitivity characteristics of the detecting unit. Consequently light transmissions of the two fluids can be effectively improved. A contrast of the interface detection can be improved.

Here a spectral intensity of the light source unit means that of the light which is detectable by the detecting unit. In the case that a filter is included on the side of the light source unit, the spectral intensity includes characteristics of the filter. A spectral detection sensitivity characteristics of the detecting unit means those of the light detected by the detecting unit. In the case that a filter is included on the side of the detecting unit, the spectral detection sensitivity characteristics includes characteristics of the filter. Characteristics of the optical path means optical losses on the optical path from the light source unit to the detecting unit. In the case that a filter is included in the optical path, characteristics of the filter are included by the optical path characteristics, but light losses due to the fluids in the light transmitting unit are not included.

The present invention will become more fully understood from the detail description given herein below and the accompanying drawings which are given by way of illustration only, and thus are not to be considered as limiting the present invention.

Further scope of applicability of the present invention will become apparent from the detailed description given herein after. However, it should be understood that the detailed description and specific examples, while indicating preferred embodiments of the invention, are given by way of illustration only, since various changes and modification within the spirit and scope of the invention will become apparent to those skilled in the art from this detailed description.

DESCRIPTION OF THE PREFERRED EMBODIMENT

Figure 1:
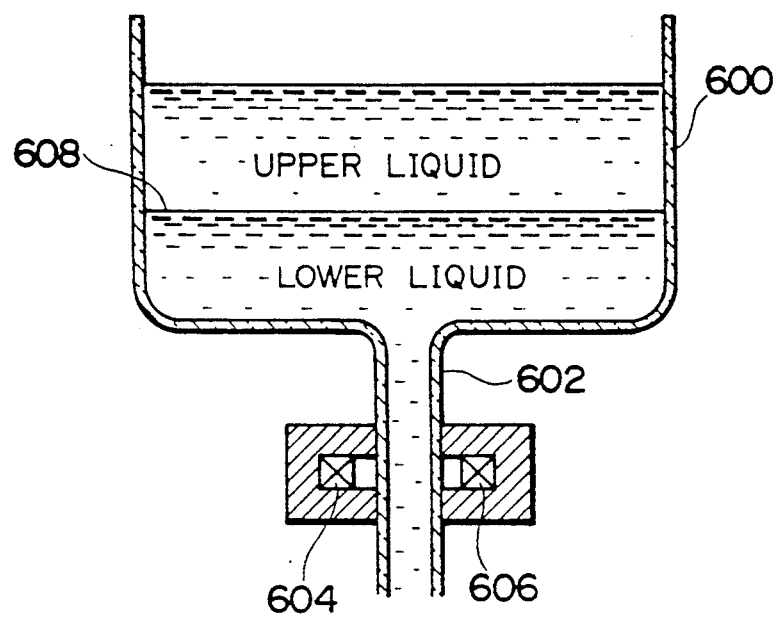
FIG. 1 is a view explaining the prior art.
Figure 2:
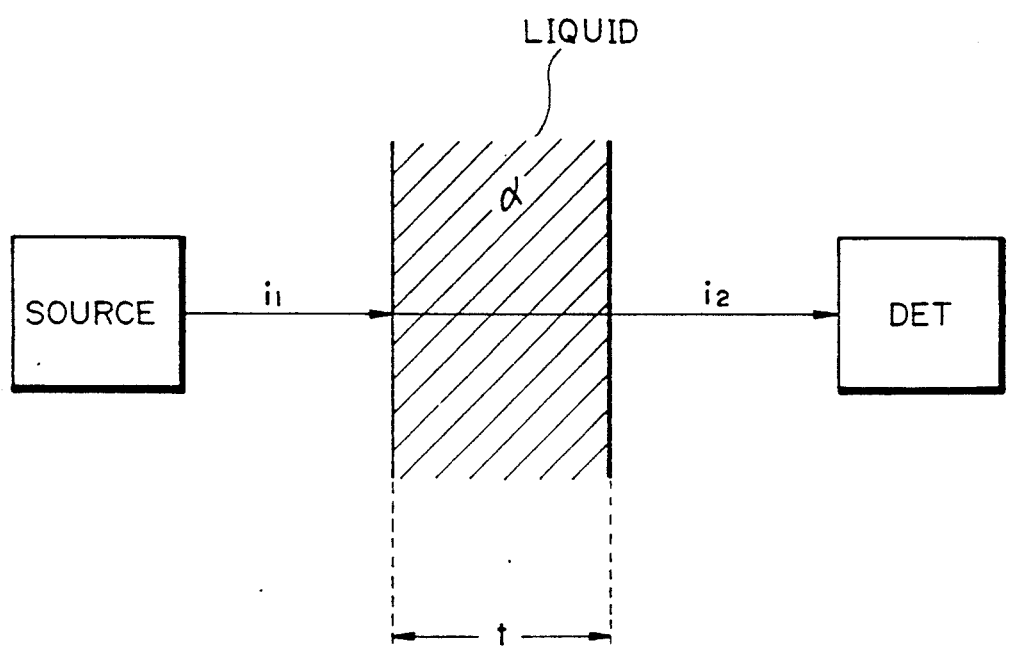
FIG. 2 is a view explaining the principle of this invention.

Before embodiments of this invention are explained, the principle of this invention will be explained briefly with reference to FIG. 2. The relationship of intensities of light on the side of a light source unit and on the side of a detecting unit which are disposed on both sides of a light transmitting unit for two liquids to pass through having two parallel flat surfaces as shown is given by the following formula.

$$i_2/i_1 = k\exp[-\alpha t] \quad (1)$$

where the symbols in the formula are defined as follows:
 $i_1$: an intensity of light source light
 $i_2$: an intensity of detected light
 t: a light transmitted distance through a liquid
 $\alpha$: a light absorption coefficient of the liquid,
 k: a light loss in a measuring system To denote Formula 1 in the unit of dBm, with $I_1 = 10 \cdot (\log i_1 + \log k)$
 $I_2 = 10\log i_2$
 $A = 10\log e$, $$I_2 = I_1 - A\alpha t \quad (2)$$

can be given.

Accordingly when a sensitivity range of the detecting unit is $I_{min} \sim I_{max}$, a required sensitivity gap (contrast) between an upper liquid and a lower liquid is $\Delta I$, an absorption coefficient of one of the liquids having a higher transmission is $\alpha_{min}$, and an absorption coefficient of the other of the liquids having a lower transmission is $\alpha_{max}$, conditions for detecting the interface are $$I_{min} \leq I_1 - A\alpha_{max}t \quad (3)$$

$$I_{max} \geq I_1 - A\alpha_{min}t \quad (4)$$

$$\Delta I \leq (\alpha_{max} - \alpha_{min})At \quad (5)$$

$\alpha_{min}$ and $\alpha_{max}$ are determined by kinds of the two liquids whose interface is to be detected, and a wavelength band of light to be used in the interface detection.

By using the above-described conditional formulae, a suitable light wavelength band is set for the interface detection of, e.g., one pair of liquids in accordance with their light absorption characteristics. Furthermore, values t, $I_1$, $I_{min}$, $I_{max}$ satisfying Formulae 3 to 5 can be determined for a $\Delta I$ which is set taking into consideration of $\alpha_{min}$ and $\alpha_{max}$, noises of output signals, etc. Consequently the interface detection can have a high contrast. Furthermore, when one pair of liquids to be detected is changed, a wavelength band of light to be used in the interface detection of the new pair of liquids, transmitted distances through the liquids, etc. are arranged to be changed in accordance with their light absorption characteristics. Regardless of kinds of liquids to be detected, the interface detection can be assured.

Figure 3:
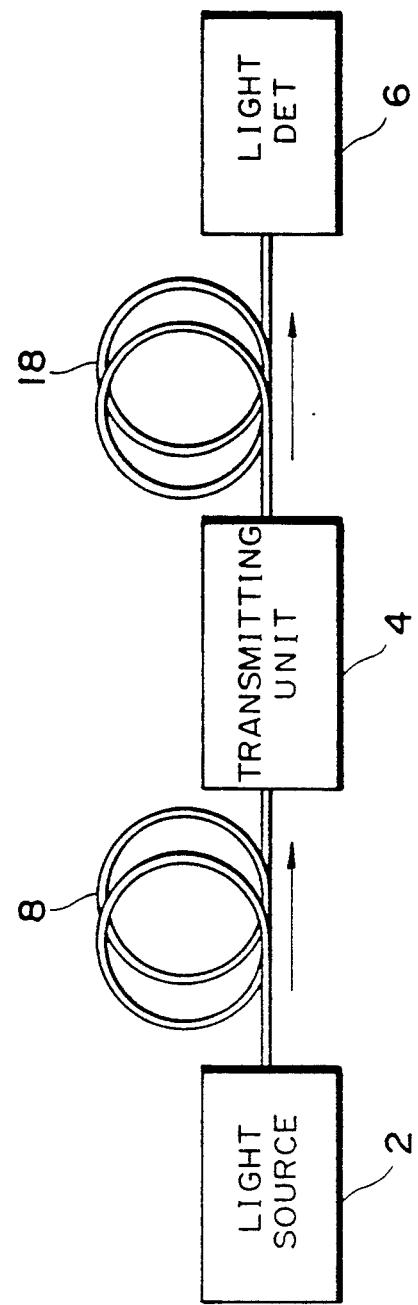
FIG. 3 is a block diagram of the device for detecting an interface according to a first embodiment of this invention.

FIG. 3 is a block diagram of the device for detecting an interface according to a first embodiment of this invention. In this device, a suitable wavelength band of light to be used in the interface detection is set for $I_1$, $I_{min}$, $I_{max}$, $\Delta I$, etc.

The light source unit 2 is provided by a Xe lamp for optical glass fibers. This Xe lamp light source condenses Xe lamp light at one point and is connectable to an optical fiber with an FC connector. Holding means for a band pass filter is provided in the Xe lamp light source. Various band pass filters as follows are provided on the holding means for limiting the light to be used in the interface detection to required wavelength bands.

No. 45: 405~495 nm wavelength
No. 52: 470~560 nm wavelength
No. 58: 530~620 nm wavelength
No. 65: 600~710 nm wavelength
No. 72: 605~770 nm wavelength The light source unit 2 may be provided by other means other than a Xe lamp. But it is not preferable that a halogen lamp, a LED or others is used as the light source unit. To vary a wavelength band it is preferable to use a Xe lamp. A small-sized Xe short arc lamp behaves like a point source, and the light from the lamp can be condensed substantially to one point by means of a mirror, a lens or others so as to be introduced into the glass fiber. By the use of various filters, optional wavelength bands can be selected. A wavelength band can be changed in accordance with kinds of liquids constituting an interface to be detected. The light source unit may be provided by a semiconductor laser, a gas laser or others. In this case, various wavelength bands can be provided by changing kinds of the laser, and the beams can be easily introduced into the optical fiber, and the device itself for detecting an interface can be compact.

The light transmitting unit 4 transmits the light from the light source unit 2 over a 16 mm-transmitted distance respectively through a lower liquid (a cleaning solvent) and an upper liquid (an agricultural chemical intermediate liquid) drawn from an intermediate processing vessel for the production of an agricultural chemical.

The light detecting unit 6 is provided by a combination of "Light Sensor MA9801A (0.38~1.15 μm, 0~−90 dBm), Anritsu" and "Power Meter ML910A, Anritsu".

The light detecting unit 6 can be provided by means other than the above. For example, combinations of light detecting devices, such as photodiodes, photomultipliers or others, and electronic circuits or others, and signals corresponding to detected light amounts are indicated. If necessary, displays can be provided.

An optical fiber 8 for leading light which guides the light from the light source unit 2 to the light transmitting unit 4 is a large-diameter quartz-based optical fiber having a 200 μm diameter in a core. An FC connector is provided at the end of the optical fiber 8. An optical fiber 18 for guiding the light which has passed through the light transmitting unit 4 to the light detecting unit 6 is a large-diameter quartz-based optical fiber having a 400 μm-core diameter. An FC connector is provided at the end of the optical fiber 18. The optical fibers may be bundle fibers. Large-diameter quartz-based optical fibers having 100 μm or more-core diameters have to be used to minimize light losses occurring upon the source light entering the optical fiber, and light losses in the light transmitting unit. But in the case that a laser is used as the light source unit 2, the core diameter can be smaller.

Figure 4:
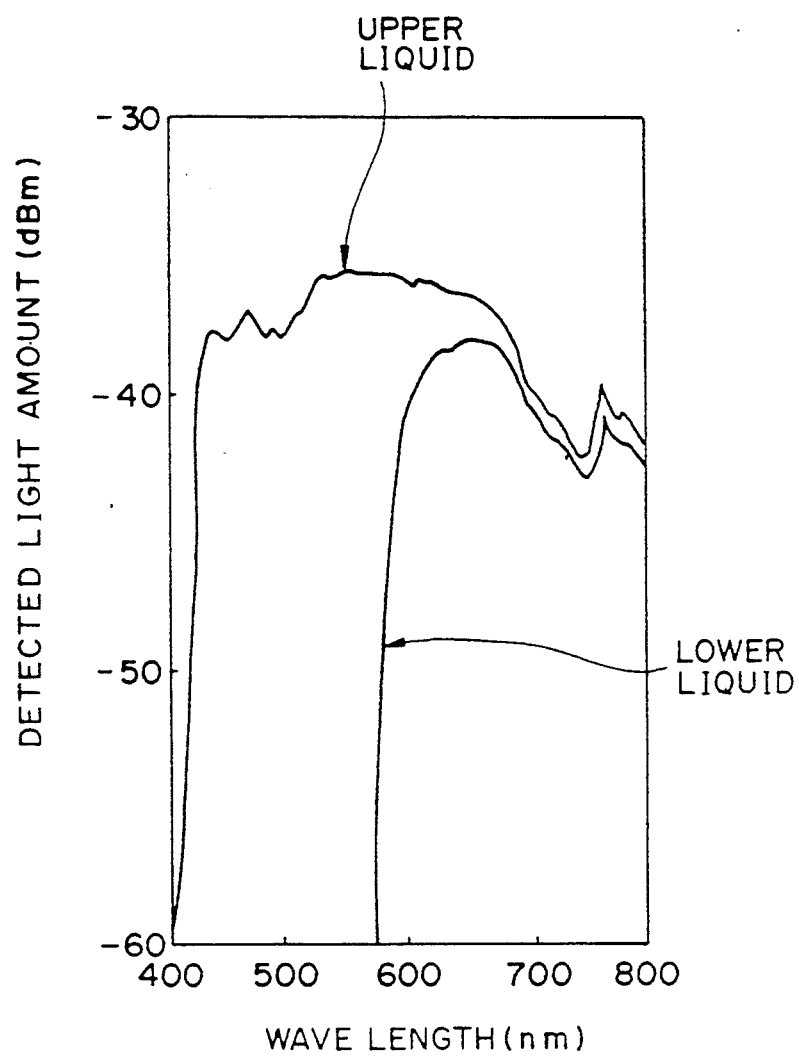
FIG. 4 is a view of the result of a measured spectral intensity distribution by a spectroanalyzer.

A spectral intensity distribution of the detected light through the light transmitting unit 4 was measured beforehand by a spectroanalyzer. In this measurement, in place of the band pass filter, a spectroanalyzer "S99A, Anritsu" was used. The result of the measurement of the spectral intensity distribution is shown in FIG. 4. As shown, to obtain a sufficient contrast $\Delta I$, it is judged suitable to set the wavelength band to be used in the interface detection at below about 600 nm. To set the light in a wavelength band below about 600 nm, the band pass filter included in the light source unit 2 is adjusted, or a spectral sensitivity of the light detecting unit 6 is adjusted.

The operation of the device of FIG. 3 will be explained with reference to the following table. The following table shows measured transmitted light amounts passing through the light transmitting unit 4 filled with an upper liquid and a lower liquid, and differences in the amounts between the upper and the lower liquids for different band pass filters. As evident from the table, sufficient contrasts can be obtained with No. 45 band pass filer and No. 52 band pass filter. On the other hand, without any band pass filter or with No. 65 band pass filter and No. 72 band pass filter, sufficient contrasts cannot be obtained.

| | Table (Difference = upper liquid light amount (dBm) − lower liquid light amount (dBm)) | | | | | |
|---|---|---|---|---|---|---|
| Filter No. | No filter | No. 45 | No. 52 | No. 58 | No. 65 | No. 72 |
| Upper liquid | −11.2 | −24.8 | −21.5 | −19.8 | −20.4 | −22.8 |
| Lower liquid | −13.0 | −61.5 | −52.9 | −26.2 | −21.6 | −22.9 |
| Difference | 1.8 | 36.7 | 31.4 | 6.4 | 1.2 | 0.1 |

In the above-described first embodiment, since the light source unit 2 and the light detecting unit 6 are interconnected with the light transmitting unit 4 by the optical fibers 8, 18, the light source unit 2 and the light detecting unit 6 can be positioned remote from the light transmitting unit 4. Consequently in chemical plants, etc., the light source unit 2 and the light detecting unit 6 are installed in the operation administration rooms, and only the light transmitting unit 4 is installed at sites. The light transmitting unit 4 requires no electric power source. Consequently no means for explosion proof is necessary to prevent an electrically sparked explosion, and a remote operation can be easily performed in the operation administration room. Furthermore, in the case that an interface of an upper and a lower liquids in a storage tank is detected, the light transmitting unit 4 easily placed in the liquids or displaced. Only the light transmitting unit 4 is installed at a site, and consequently there is little locational limitation.

The device for detecting an interface according to a second embodiment of this invention will be explained below. In this embodiment, a light wavelength band and a transmitted distance t through a liquid are optimized for given $I_1$, $I_{min}$, $I_{max}$ $\Delta I$, etc.

The same light detecting unit 6 as in the first embodiment is used in this second embodiment. The light source unit 2 is provided by a semiconductor laser beam emitter (670 nm × 3 mW) with means for feeding a beam into an optical fiber.

The optical transmitting unit 4 transmits a beam from the light source 2 through a lower liquid (intermediate liquid of dark blue dye) and an upper liquid (a cleaning solvent) drawn from an intermediate processing vessel for the production of dark blue dye over light transmitted distances through the liquids of 0.25 mm, 0.5 mm, 1.0 mm and 2.0 mm.

Figure 5:
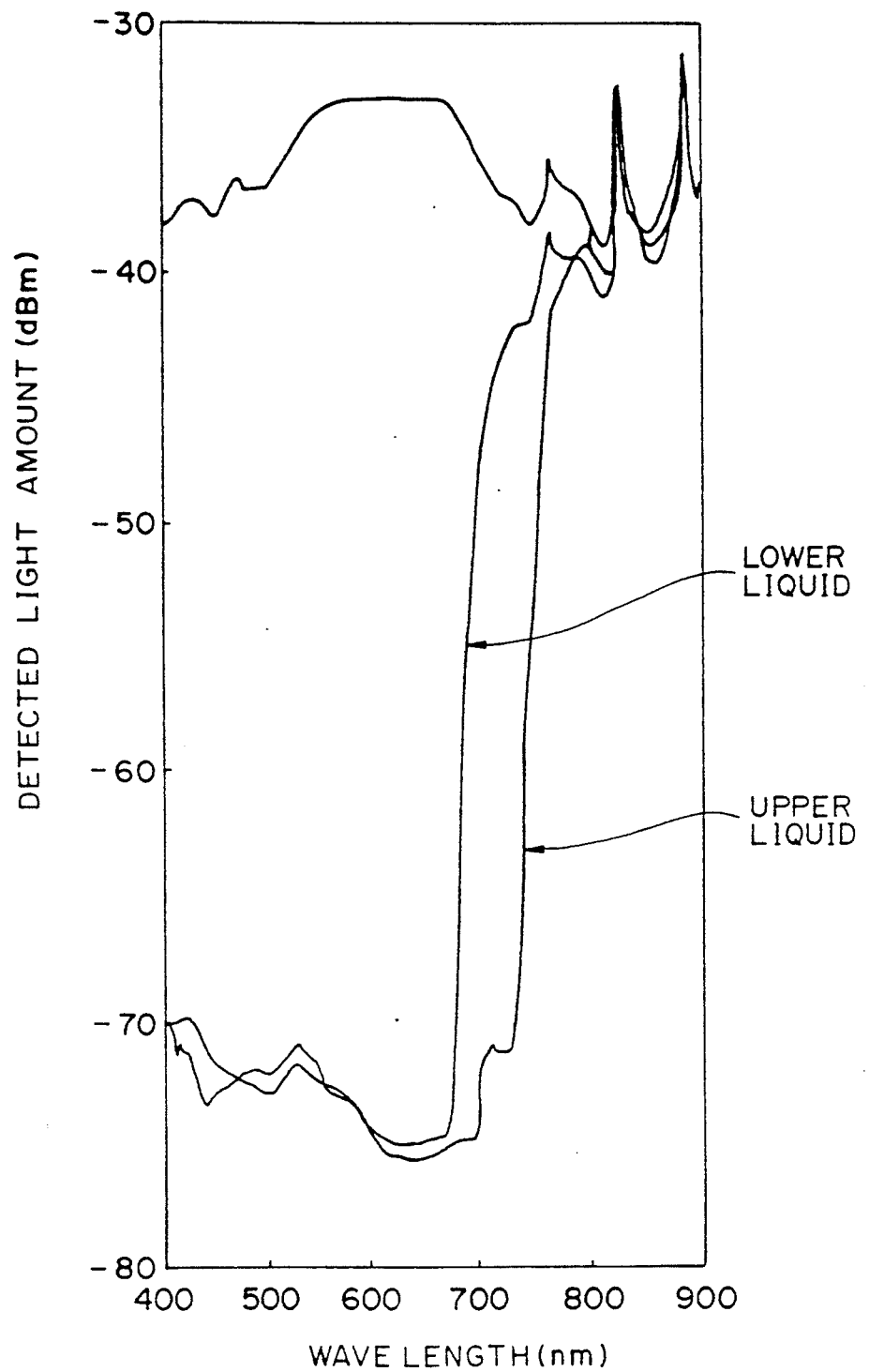
FIG. 5 is a view of the result of a measured spectral intensity distribution by a spectroanalyzer.

First, a spectral detected light intensity distribution of the light transmitting unit 4 was measured by a spectroanalyzer in the same way as in the first embodiment. FIG. 5 shows the result of the measured spectral intensity distribution. As shown, the light transmission is poor in the visible light region for both the upper and the lower liquids, and good in the infrared region. To obtain a sufficient contrast $\Delta I$, it is judged suitable to set the wavelength band to be used in the interface detection at about 690~750 mm.

Figure 6:
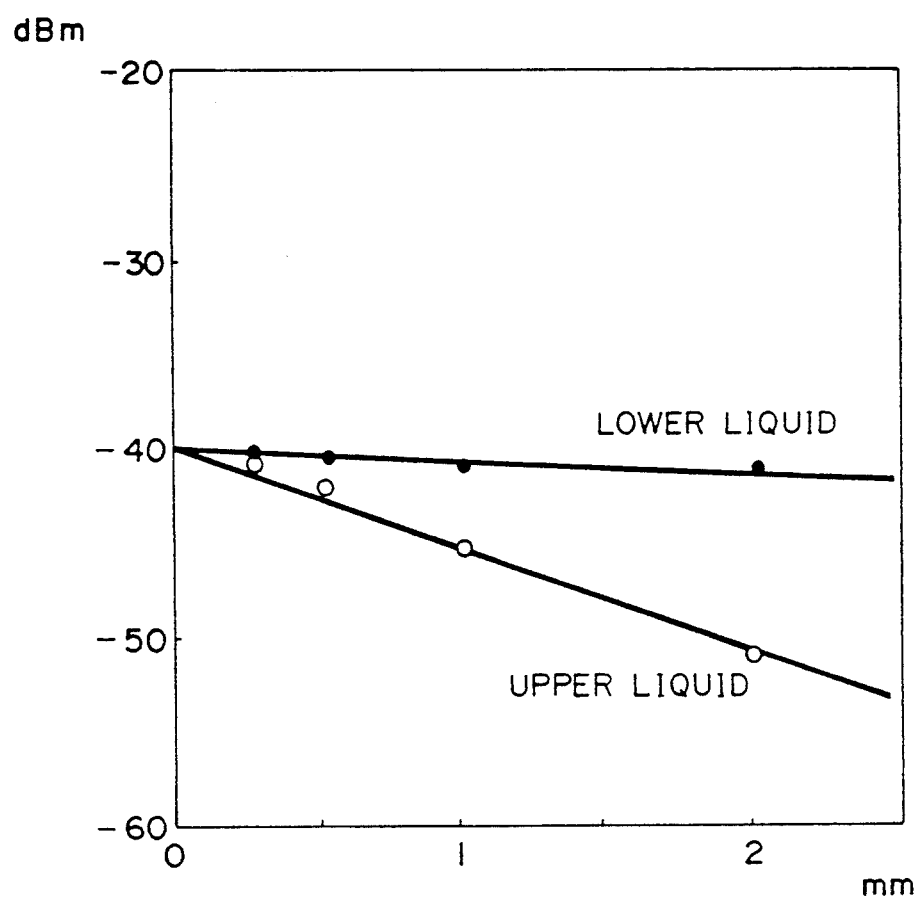
FIG. 6 is a view of a result of the measurement by the device for detecting an interface according to a second embodiment of this invention.

The operation of the device for detecting an interface according to the second embodiment will be explained with reference to FIG. 6. The graph of FIG. 6 shows a relationship between a transmitted distance (mm) through a liquid, and a detected signal value (dBm) obtained when the light transmitting unit 4 is filled with either of the upper and the lower liquids. In this relationship, the light absorption coefficient of the lower liquid (corresponding to $\alpha$ of Formula 2) is not large, but that of the upper liquid is as large as about $-5$ dB/mm. Accordingly, as the transmitted distance through the upper liquid increases, the detected signal value of the upper liquid rapidly falls. Taking the detected signal values into consideration, it is found optimum that the transmitted distances through the liquids for the device according to the second embodiment is about 1~3 mm. Thus, by setting a transmitted distance through a liquid, the interface between an upper and a lower liquids can be easily and accurately detected.

Figure 7C:
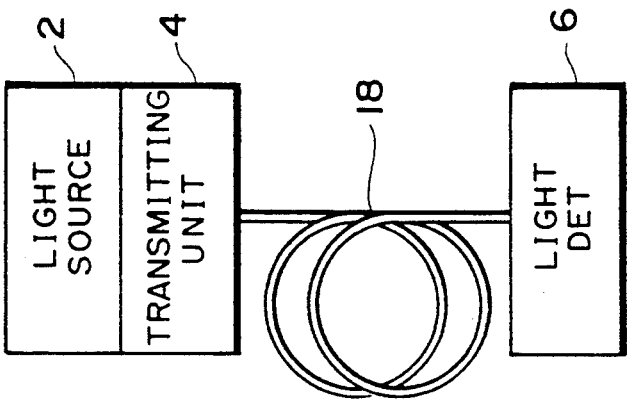
FIG. 7A, 7B, 7C are views of block diagrams of the device for detecting an interface according to a third to a fifth embodiments of this invention.
Figure 7B:
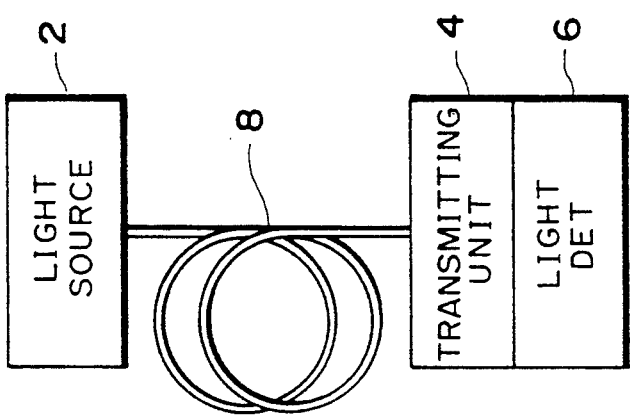
Figure 7A:
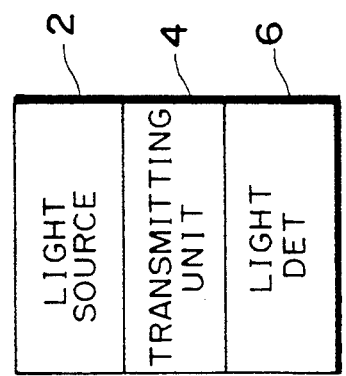

FIGS. 7A to 7C show a third to fifth embodiments which are structural variations of the device of FIG. 3. FIG. 7A shows a block diagram of the device for detecting an interface according to a third embodiment. In the third embodiment, the optical fibers 8, 18 are not used, but instead the light source unit 2, the light transmitting unit 4, and the light detecting unit 6 are connected directly to each other. Consequently the device can be integrated as a whole. As the light source unit, a semiconductor laser, a gas laser or a xenon lamp, or a halogen lamp, a LED or others, which is not a point source, is usable. But explosion-proof means are necessary at dangerous locations, such as chemical plants, which require explosion proofing to prevent an electrically sparked explosion. In the case that a halogen lamp, a LED or others is used, it is preferable to condense the light by means of an optical system, e.g., a lens, mirror or others. An optional wavelength band can be set by a filter, or light of different wavelengths can be obtained by selecting kinds of LEDs.

FIG. 7B shows a block diagram of the device for detecting an interface according to a fourth embodiment. In this embodiment, the optical fiber 8 for sending light is used. But the optical fiber 18 for receiving light is not used, and the light transmitting unit 4 and the light detecting unit 6 are connected directly to each other.

FIG. 7C shows a block diagram of the device for detecting an interface according to a fifth embodiment of this invention. In the fifth embodiment, the optical fiber 18 for receiving light is used, but the optical fiber 8 for sending light is not used. The light source 2 and the light transmitting unit 4 are connected directly to each other.

Figure 8:
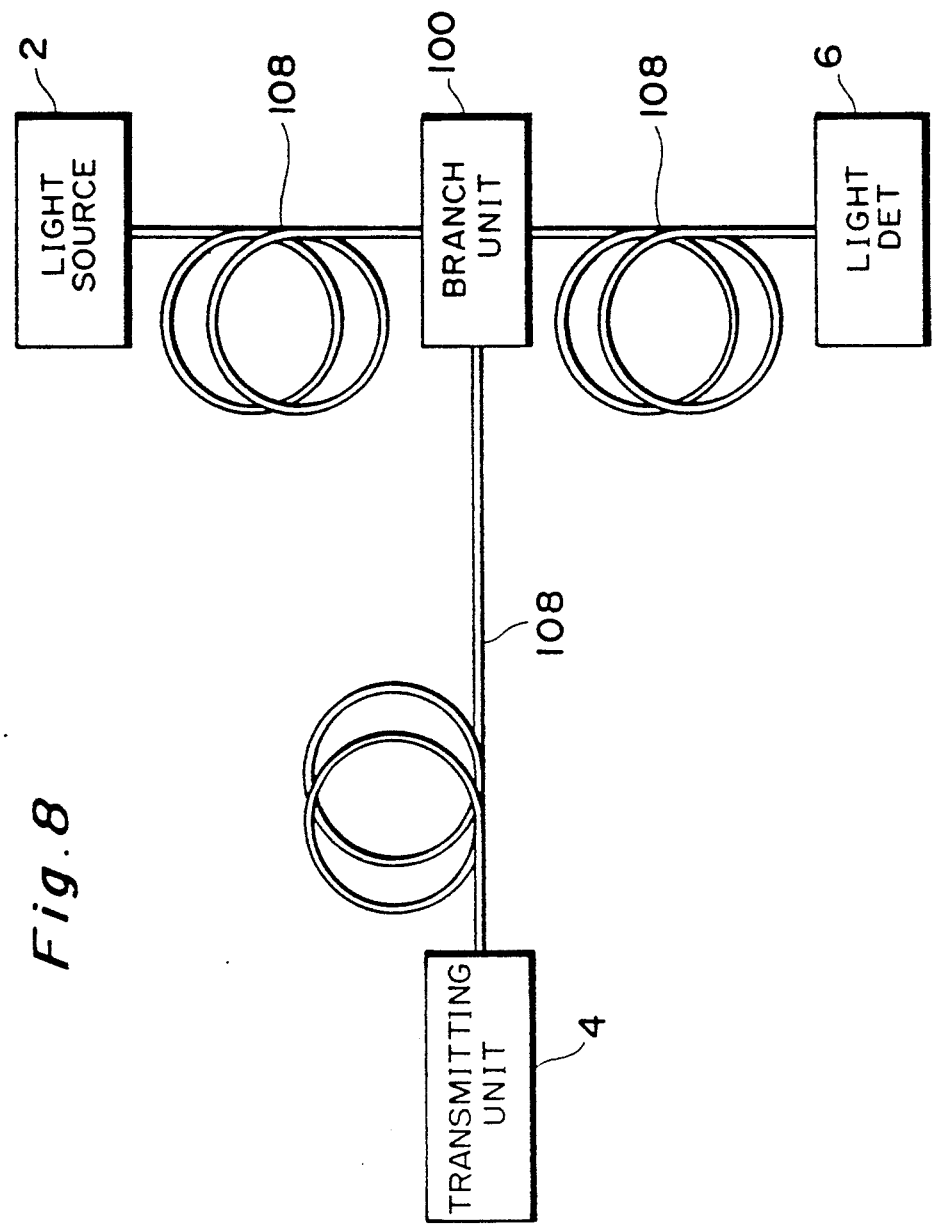
FIG. 8 is a block diagram of the device for detecting an interface according to a sixth embodiment of this invention.

FIG. 8 shows a block diagram of the device for detecting an interface according to a sixth embodiment. Light emitted by the light source unit 2 enters a light splitter 100 through an optical fiber 108 for sending light, and then enters the light transmitting unit 4 through an optical fiber 108 for sending/receiving light. The light which has passed the light transmitting unit 4 passes back through the optical fiber 108 for leading-/receiving light to the branch unit 100, and enters the light detecting unit 6 through the optical fiber 108 for receiving light. The light source 2 and the light detecting unit 6 can be integrated to omit the optical fiber for sending light and the optical fiber for receiving light.

Figure 9:
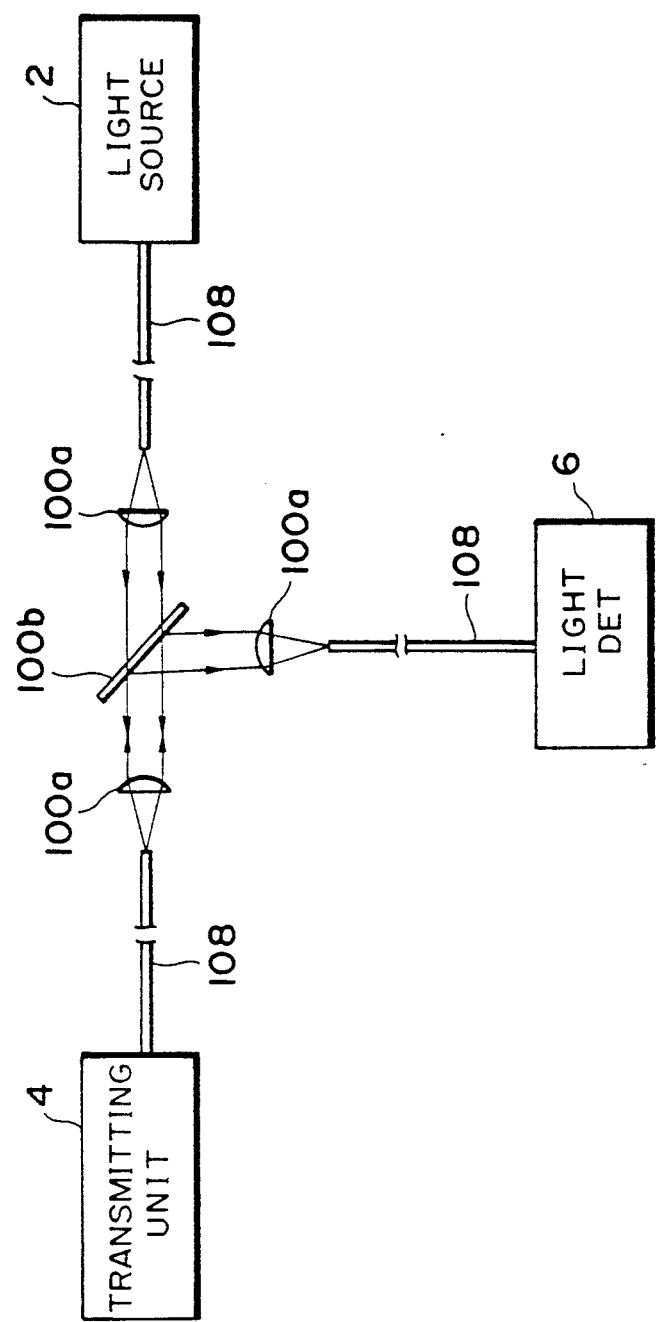
FIG. 9 is a view of an example of the structure of a branch unit.
Figure 10:
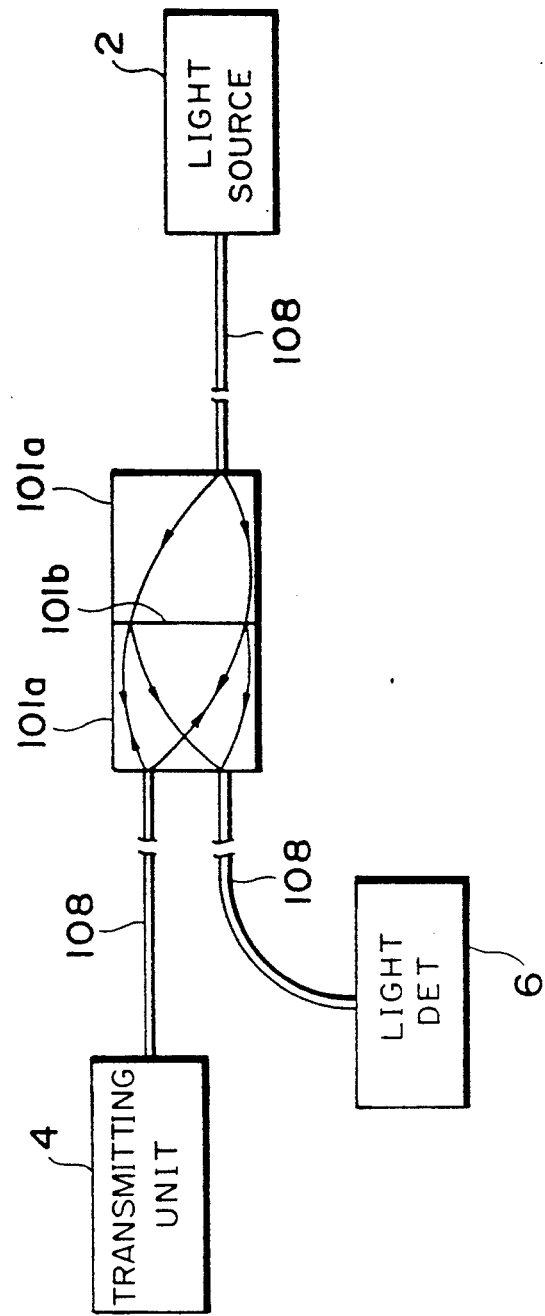
FIG. 10 is a view of another example of the structure of the branch unit.

FIGS. 9 and 10 show examples of the structure of the branch unit 100 in FIG. 8. FIG. 9 shows an example using a collimator lens 100a and a half mirror splitter 100b. FIG. 10 shows an example using a rod lens 101a and a semi-transparent film 101b.

FIGS. 11 to 20 show examples of the structure of the light transmitting unit. As will be explained below in good detail, the shown structures of the light transmitting unit can propagate the incident light from the light source unit to the detecting unit efficiently (with small light losses) and realize desired distances for transmitting light through a liquid.

Figure 11:
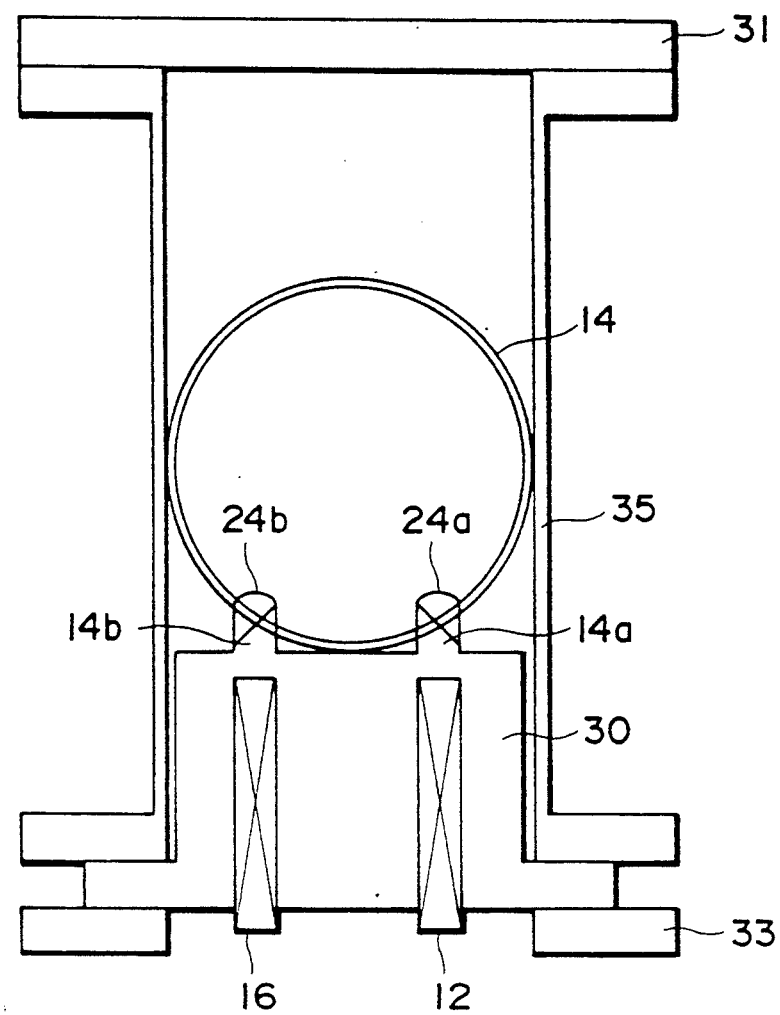
FIG. 11 is a first example of the structure of a light transmitting unit.
Figure 12:
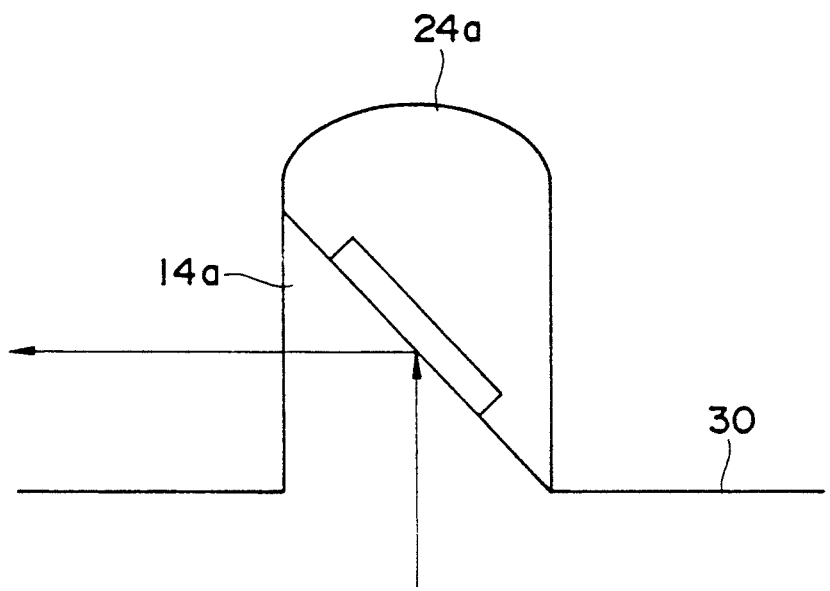
FIG. 12 is a detailed view of a glass member included in the light transmitting unit.

FIG. 11 shows a first example of the light transmitting unit. The light transmitting unit according to this example is for a case that a transmitted distance through a liquid is relatively short.

A pipe 14 for liquids-to-be-measured to pass through is connected perpendicularly to the pipe member 35. The pipe 14 is inserted in openings formed in vertically opposed sides of the pipe member 35 and welded thereto. That is, a cylindrical space is defined by the sidewall of the pipe member 35, a blank flange 31 provided on one end of the pipe member 35, and a glass member 30 provided on the other end of the pipe member 35. The space is filled with liquids to be detected. The glass member 30 is secured to the pipe member 35 by a set flange 33.

The glass member 30 includes a cylindrical light applying unit space for accommodating a light applying unit 12 connected to the light source, and a cylindrical light receiving unit space for accommodating a light receiving unit 16 connected to a light detecting unit. On the top of the glass member 30 there are formed prisms 14a, 14b, and caps 24a, 24b for protecting the prisms 14a, 14b are secured to the tops of the prisms 14a, 14b. The material of the glass member 30 may be any material as long as it is transparent and transmits light in a set wavelength band. The material is exemplified by quartz, Pyrex glass, MMA or others.

The prisms 14a, 14b have reflection surfaces for deflecting light by 90° or about 90°.

Specifically, the reflection surfaces are formed by, 1) evaporating a metal, such as Al or others on the top surfaces of the prisms 14a, 14b and adhering the caps 24a, 24b to the tops of the prisms, or 2) forming a small recess (of, e.g., an about 100 µm-depth) in a part of the underside of each cap 24a, 24b except the peripheral part thereof and adhering the cap 24a, 24b to the top surface of the associated prism 14a, 14b. Thus, the prisms 14a, 14b can function as total reflection mirrors ( see FIG. 12 ). The method 2) enables the prisms and the caps to be melt-bonded to each other, and their joint can be fully durable to various kinds of liquids, such as solvent or others.

A transmitted distance of light through a liquid is determined by a spacing between the prisms 14a, 14b. A transmitted distance t is selected in accordance with $I_1$, $I_{min}$, $I_{max}$, $\Delta I$, $\alpha_{min}$, $\alpha_{max}$, etc. as described above, and based on the distance, a spacing between the prisms 14a, 14b is determined. For example, when a nominal bore of the pipe 14 is 50A (outer diameter: 60.5 mm), a transmitted distance through a liquid is selected within a range below about 30 mm. When a transmitted distance through a liquid is very small, sometimes an apparatus for cleaning between the prisms 14a, 14b is necessary.

The light applying unit 12 is for efficiently guiding a bundle of rays emitted by the light source unit to the light receiving unit. The light applying unit 12 is fitted in the light applying unit space formed in the glass member 30 and has the optical axis adjusted by suitable means. In the case that the light source unit is provided by a lamp light source, such as a xenon lamp, a LED, or others, which is directly connected to the light applying unit 12, it is possible to beforehand form on the side of the light source a bundle of rays of good directive to the central portion of the prism 14a. But if necessary, a lens is provided also in the light applying unit 12 for forming parallel rays. In the case that an optical fiber for sending light is provided between the light source and the light applying unit 12, it is preferable to form parallel rays or substantially parallel rays (e.g., a bundle of rays which is slightly convergent so as to be condensed near the light detecting unit) by a collimator lens, because a beam emitted from the optical fiber to the prism 14a diverges corresponding to an NA, or numerical aperture, value. In the case that a laser directly coupled to the light applying unit 12 is used as the light source unit, these arrangements are not usually necessary, because the emitted beams have sufficient directive. It is possible that the light applying unit 12 is, e.g., in the form of a cylindrical member having both end surfaces formed in smooth and flat surfaces, and having an aluminum evaporated peripheral side surface, and the input end is positioned near the emitting window of the light source.

The light receiving unit 16 is for efficiently guiding a bundle of rays emitted from the light source unit via the prisms 14a, 14b to the light detecting unit. In the case that the light detecting unit is directly coupled to the light receiving unit 16, the light receiving unit 16 is in the form of, e.g., a cylindrical member having both end surfaces in smooth and flat surfaces and having an aluminum evaporated side, and its light emitting end is positioned near a light receiving window of the light detecting unit. In the case that an optical fiber for receiving light is provided between the light applying unit 23 and the light detecting unit, a condenser lens is provided in the light receiving unit 16, and the light receiving end of the optical fiber is positioned at a point where light is collected by the condenser lens.

Figure 13:
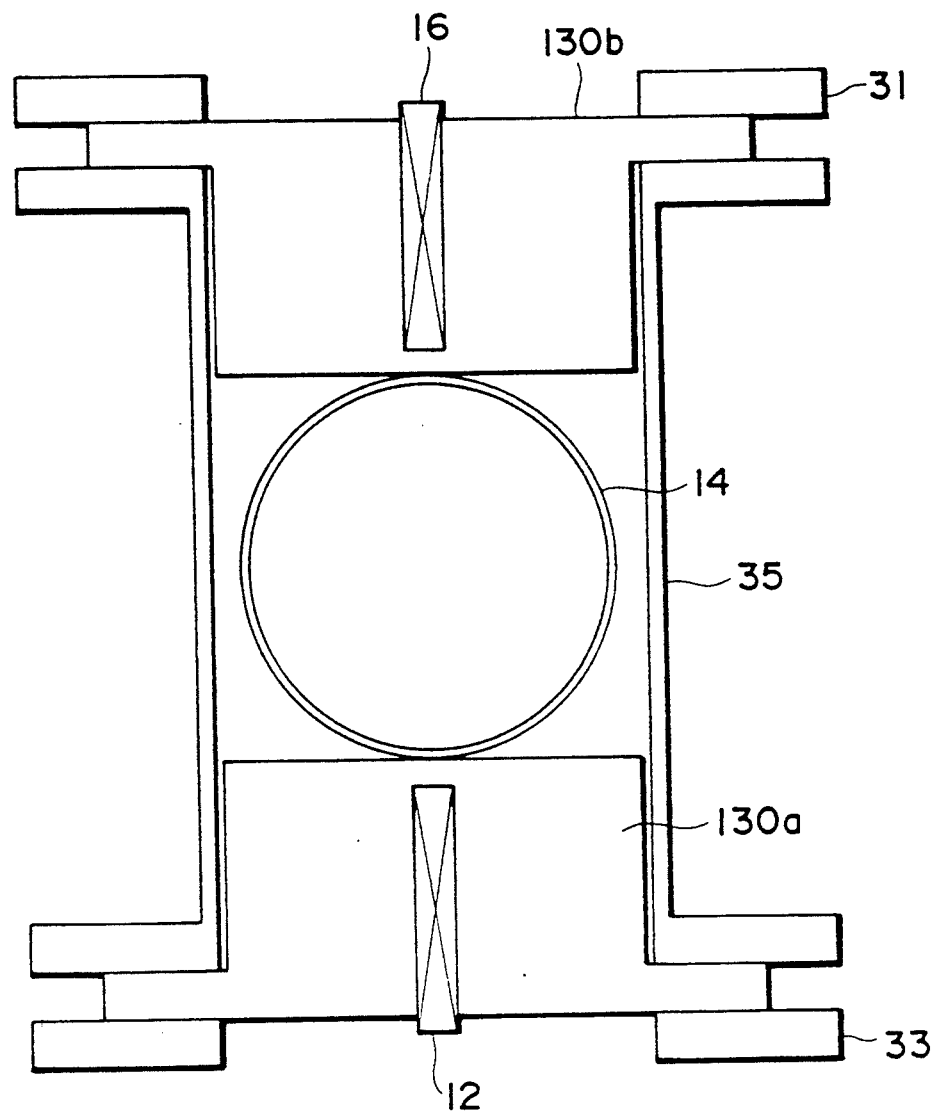
FIG. 13 is a view of a second example of the structure of the light transmitting unit.

FIG. 13 shows a second example of the structure of the light transmitting unit. This light transmitting unit has substantially as long a transmitting distance through a liquid as the interior diameter of the pipe. In this example, the light transmitting unit comprises a pair of glass members 130a, 130b. Each glass member 130a, 130b includes the light applying unit 12 and a light receiving unit 18 opposed to each other. It is not necessary that the optical axis of the light applying unit 12 passes through the central axis of the pipe 14. When a diameter of the pipe 14 is 50A, for example, the transmitted distance through a liquid can be selected in a range of about 50~100 mm.

Figure 14:
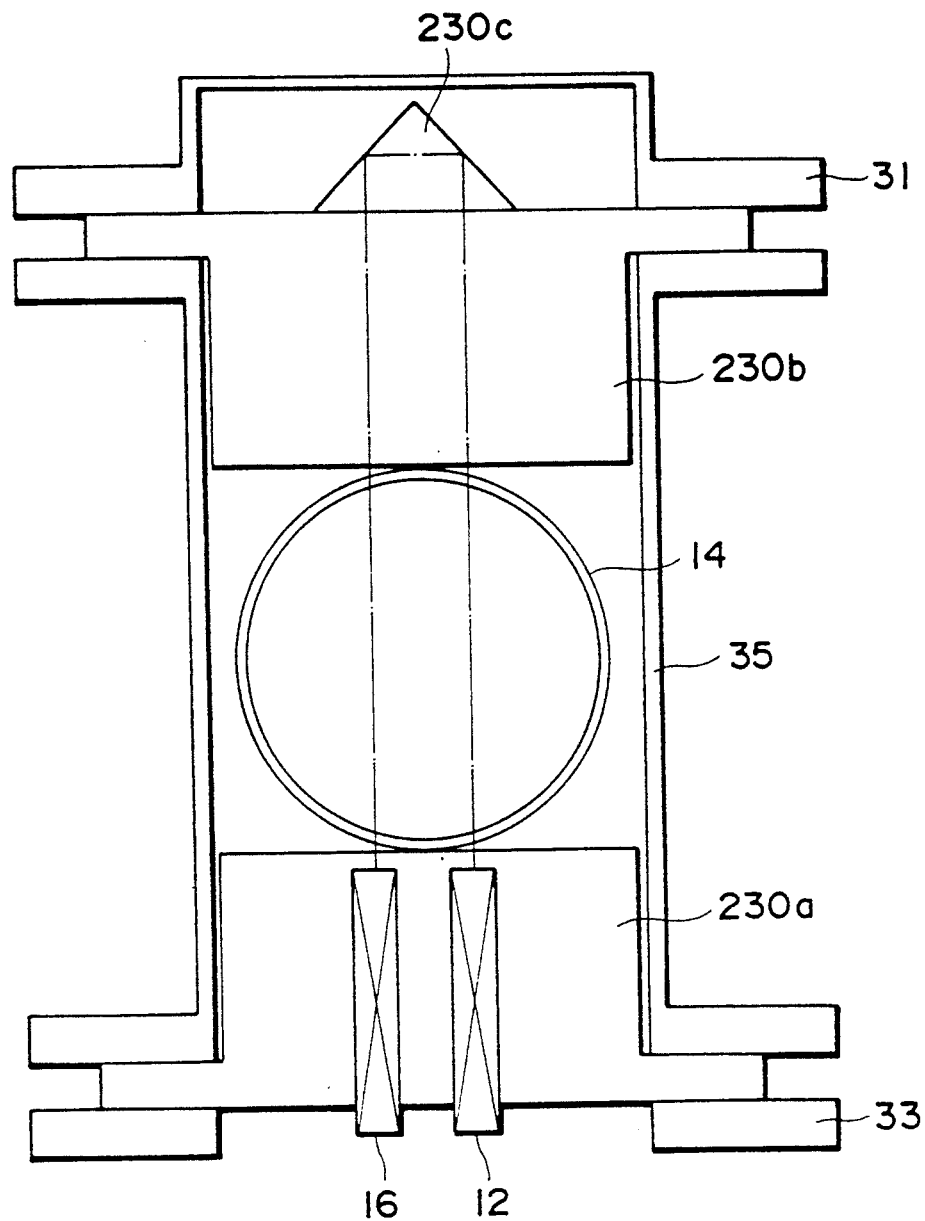
FIG. 14 is a view of a third example of the structure of the light transmitting unit.

FIG. 14 shows a third example of the structure of the light transmitting unit. This light transmitting unit has a further longer transmitted distance through a liquid and comprises a pair of glass members 230a, 230b. One 230a of the glass members includes the light applying unit 12 and the light receiving unit 16. The other glass member 230b includes a reflecting prism 230c. The reflecting prism 230c is provided by a rectangular prism, a corner-cube prism or others. Consequently the light emitted from the light applying unit 12 makes a round trip to the light receiving unit through the liquids. When the pipe 14 has a diameter of 50A, the transmitted distance through a liquid can be selected in a range of about 100~200 mm.

Figure 15:
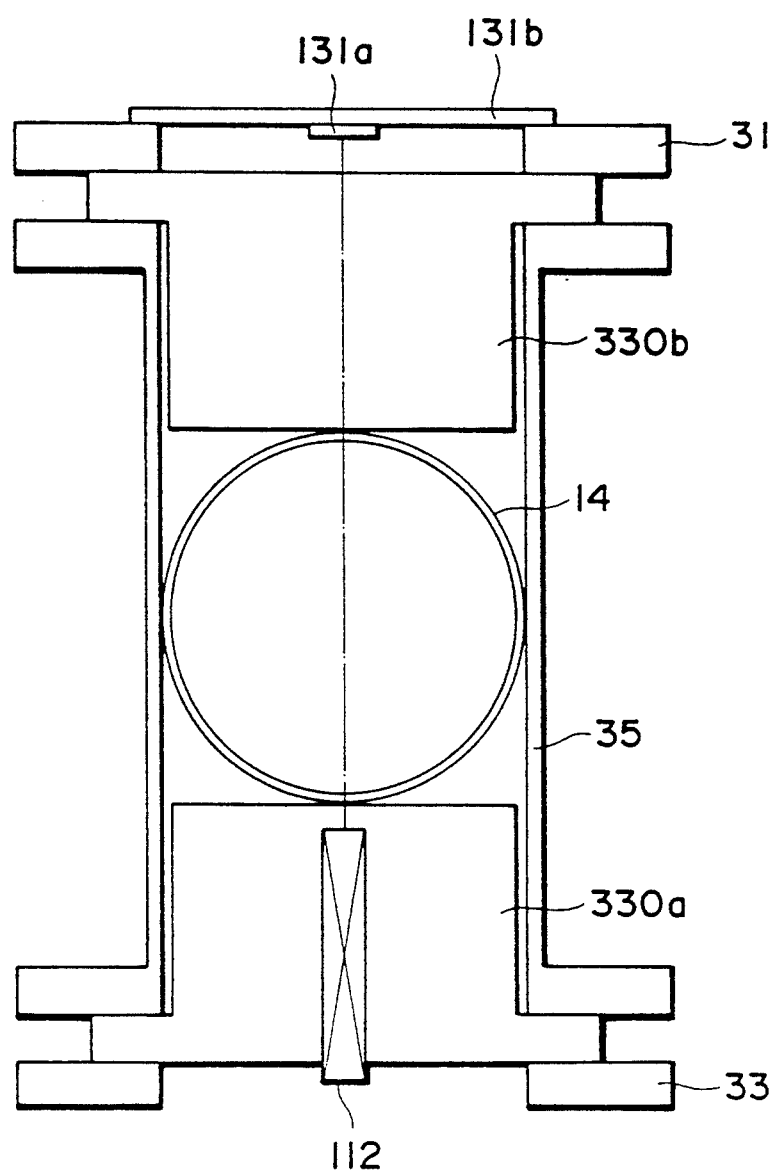
FIG. 15 is a view of a fourth example of the structure of the light transmitting unit.

FIG. 15 shows a fourth example of the structure of the light transmitting unit. This light transmitting unit has substantially as long a transmitted distance through a liquid as is possible given the confirms of the pipe's interior diameter. This light transmitting unit comprises a pair of glass members 330a, 330b. One 330a of the glass members includes a light applying/light receiving unit 112, and the other glass member 330b includes nothing. But on the blank flange 31 there are provided a reflecting mirror 131a for reflecting the light exiting the glass member 330b, and a jig 131b for adjusting a direction of the reflecting mirror. Consequently the light exiting the light applying/light receiving unit 12 passes through the glass members 330a, 330 b, etc., then reflected by the reflecting mirror 131a, again passes through the glass members 330a, 330b, etc., and is incident on the light applying/light receiving unit 112. When the pipe 14 has a diameter of 50A, the transmitted distance through a liquid can be selected in a range of about 100~200 mm.

Figure 16:
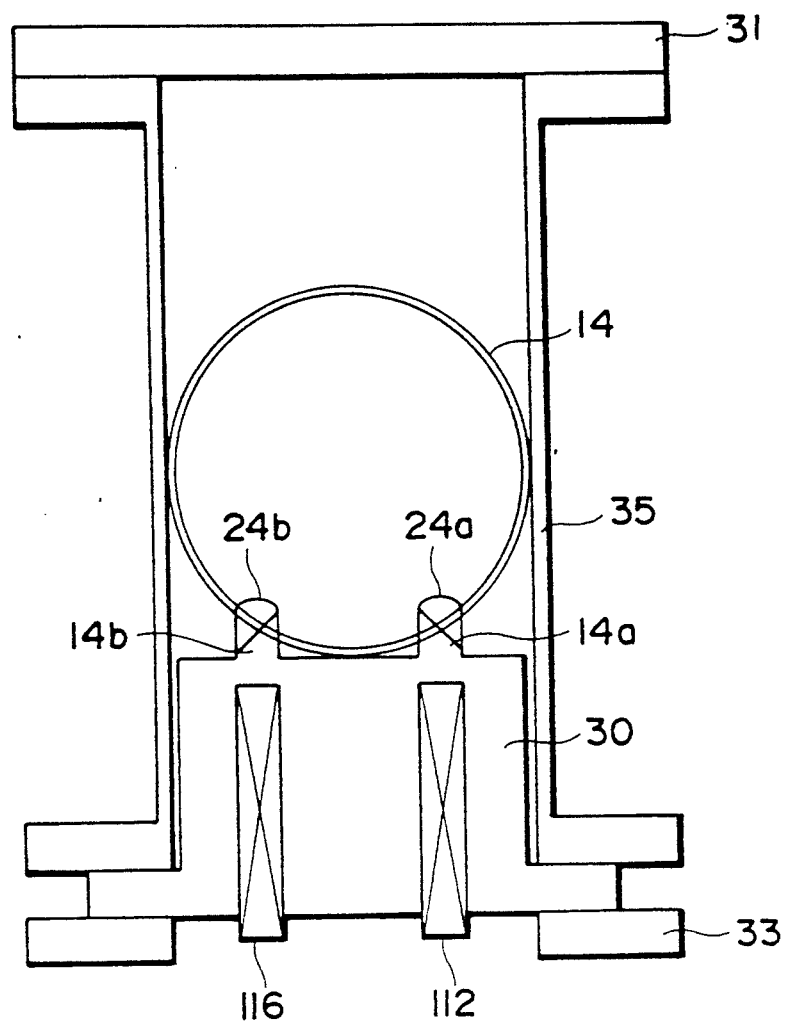
FIG. 16 is a view of a fifth example of the structure of the light transmitting unit.

FIG. 16 shows a fifth example of the structure of the light transmitting unit. This light transmitting unit is a variation of the first example of FIG. 11. A cylindrical member 116 having an aluminum evaporated end surface is inserted in one of the spaces formed in a glass member 30, and a light applying/light receiving unit 112 coupled to an optical fiber is inserted in the other space. The light exiting the light applying/light receiving unit 112 makes a round-trip back to the light applying/light receiving unit 112 through the liquids.

Figure 17:
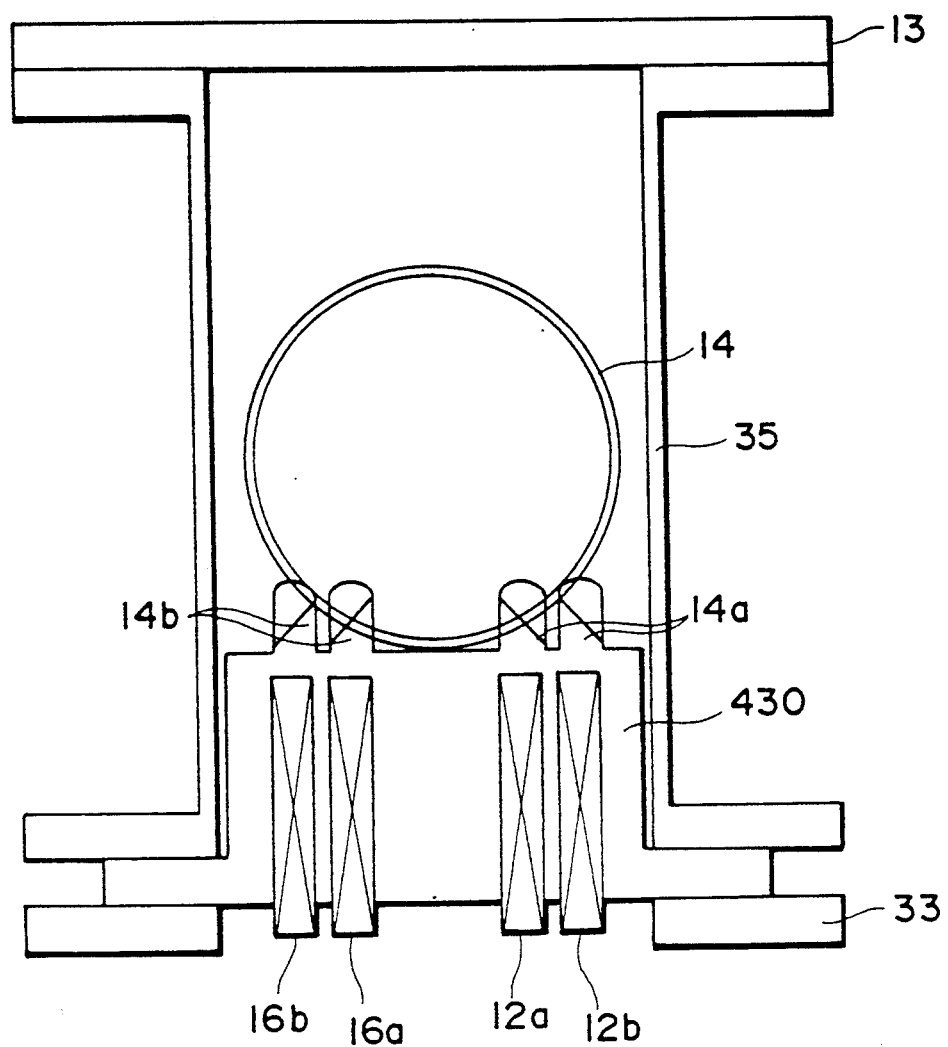
FIG. 17 is a view of a sixth embodiment of the structure of the light transmitting unit.
Figure 18:
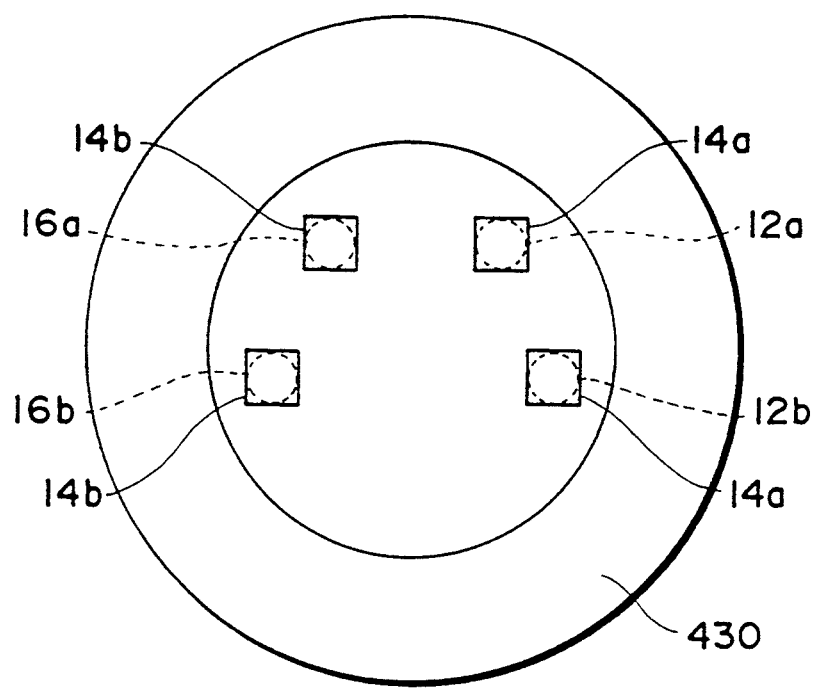
FIG. 18 is a plan view of a glass member included in the light transmitting unit.

FIG. 17 shows a sixth example of the structure of the light transmitting unit. This light transmitting unit is a variation of the first embodiment of FIG. 11. The transmitted distance through a liquid can be changed corresponding to liquids. In a glass member 430 there are provided one pair of light applying unit 12a and a light receiving unit 16a having a relatively short transmitted distance, and another pair of light applying unit 12b and a light receiving unit 16b having a relatively long transmitted distance. A transmitted distance can be adjusted corresponding to kinds of two liquids constituting an interface to be detected. FIG. 18 is a cross sectional view of the glass member 430.

Figure 19:
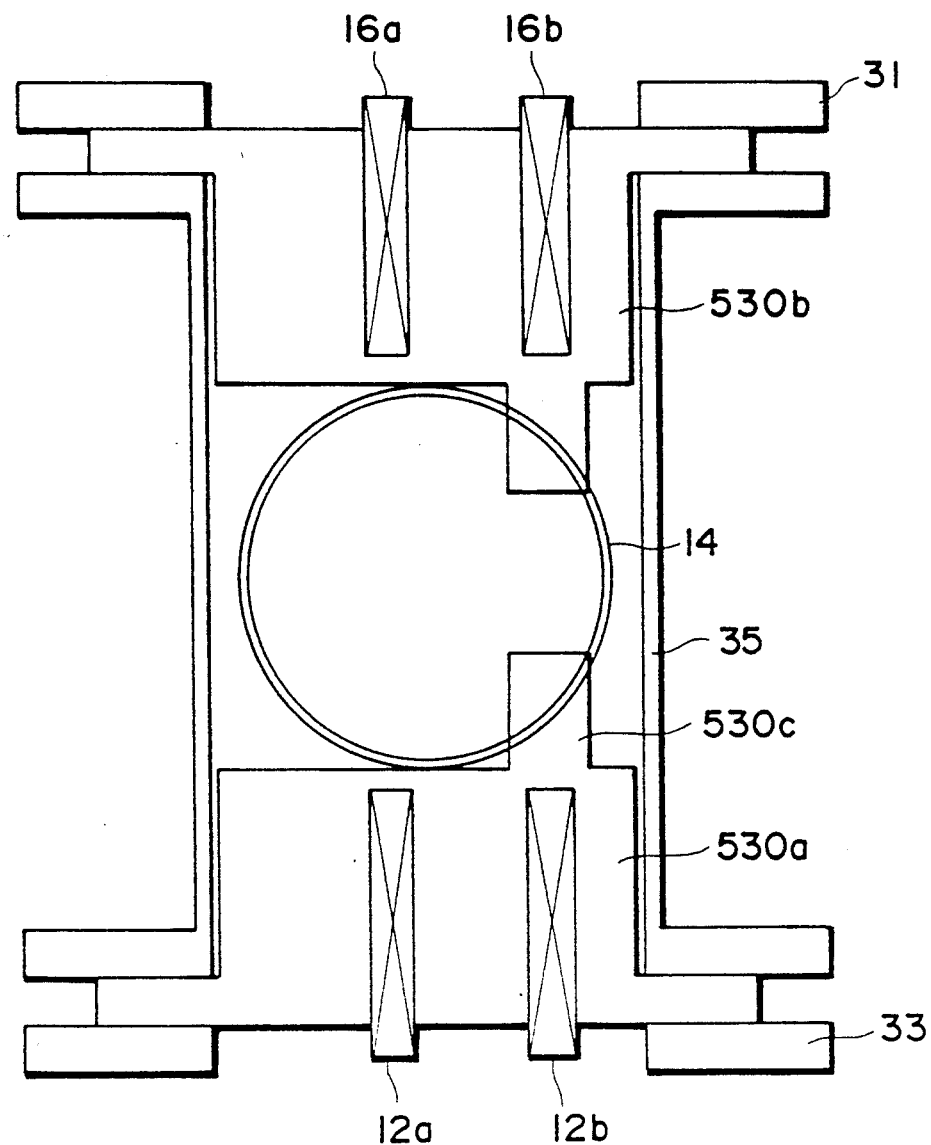
FIG. 19 is a view of a seventh example of the light transmitting unit.
Figure 20:
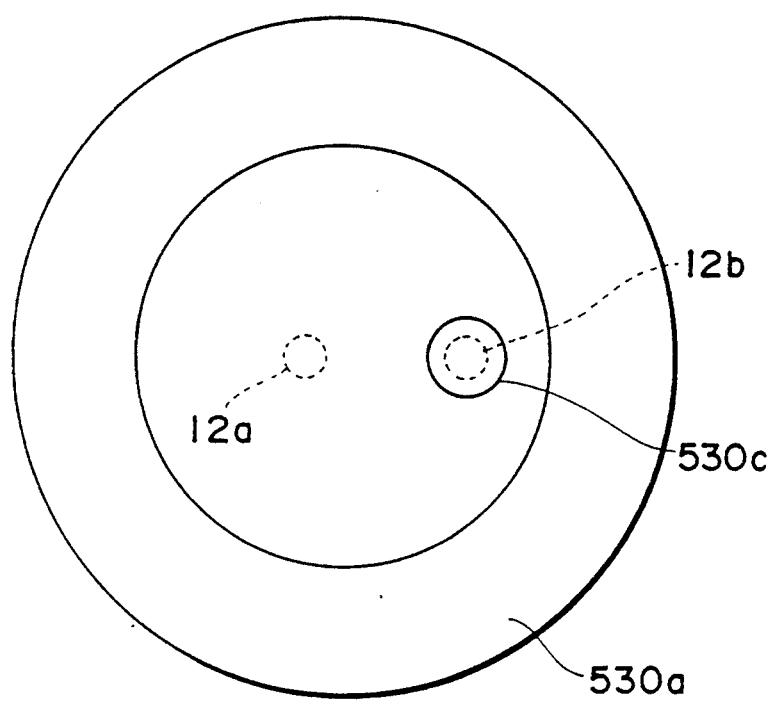
FIG. 20 is a plan view of a glass member included in the light transmitting unit.

FIG. 19 shows a seventh example of the structure of the light transmitting unit. This light transmitting unit is a variation of the second example of FIG. 13. A transmitted distance through a liquid can be changed corresponding to kinds of two liquids constituting an interface to be detected. Glass members 530a, 530b include a pair of light transmitting unit 12a and a light receiving unit 16a having a relatively long transmitted distance, and a pair of light applying unit 12b and a light receiving unit 16b having a relatively short transmitted distance and a light receiving unit 16b. Their transmitted distance through a liquid can be adjusted corresponding to kinds of two liquids constituting an interface to be detected. FIG. 20 is a cross sectional view of the glass member 530a. A transmitted distance through a liquid is determined by a length of a projection 530c provided on the top of the glass member 530a.

When a transmitted distance through a liquid is adjusted corresponding to a kind of liquid, light to be supplied to a plurality of light applying units may be switched on the side of the light source, or light-to-be-detected from the light receiving unit is switched on the side of the light detecting unit. It is possible to suitably combine the light applying units and the light receiving units of FIG. 11 to 16 into light transmitting units.

When a level of an output of the light detecting unit ($I_2$ in Formula 2) is adjusted, a spectral intensity of the light source ($i_1$, accordingly $I_1$ in Formula 2) is changed. This change is made by directly changing a light amount of the light source or by adjusting by an ND filter or others.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A method for detecting an interface between a first and second fluid in a light transmitting unit, the fluids passing through the light transmitting unit occupying a part of an optical path between a light source and a detecting unit, comprising:
   in accordance with at least one light transmitting characteristic of at least one of the first and second fluids, setting a spectral intensity of the light source, at least one characteristic of an optical path from the light source to the detecting unit, and spectral detection sensitivity of the detecting unit; and
   detecting the interface according to when an output difference, between an output of the detecting unit in the presence of light transmitted through the first fluid when said first fluid occupies the part of the optical path in the light transmitting unit and an output of the detecting unit in the presence of light transmitted through the second fluid when said second fluid occupies the part of the optical path in the light transmitting unit, exceeds a set value,
   so as to monitor a deflection of an output of the detecting unit, whereby passage of an interface between the first and the second fluids through the light transmitting unit is detected.

2. A method for detecting an interface according to claim 1, wherein the spectral intensity of the light source, the characteristics of the optical path from the light source to the detecting unit, and the spectral detection sensitivity characteristics of the detecting unit are set in accordance with the light transmitting characteristics of the first and the second fluids so as to limit light to be used in the detection of the interface to a wavelength band.

3. A method for detecting an interface according to claim 1, wherein a transmitted distance of light through the fluids along that part of the optical path from the light source to the detecting unit in the light transmitting unit is determined in accordance with the light transmitting characteristics of the first and the second fluids, the spectral intensity of the light source, the characteristics of the optical path from the light source to the detecting unit, and the spectral detection sensitivity characteristics of the detecting unit.

4. A method for detecting an interface according to claim 1, wherein the spectral intensity of the light source is changed in accordance with kinds of the first and the second fluids passing through the light transmitting unit.

5. A method for detecting an interface according to claim 2, wherein the wavelength band of the light to be used in the detection of the interface is changed in accordance with kinds of the first and the second fluids passing through the light transmitting unit.

6. A method for detecting an interface according to claim 3, wherein the transmitted distances of light through the fluids along that part of the optical path from the light source to the detecting unit in the light transmitting unit is changed in accordance with kinds of the first and the second fluids passing through the light transmitting unit.

7. A device for detecting an interface between fluids, the device comprising:
   a light transmitting unit for a first fluid and a second fluid to pass through, respectively;
   a light source for supplying light to the light transmitting unit; and
   a detecting unit for detecting a change of an intensity of the light from the light source which has passed through the light transmitting unit,
   a spectral intensity of the light source, at least one characteristic of an optical path from the light source to the detecting unit, said light transmitting unit occupying a part of the optical path, and spectral detection sensitivity of the detecting unit are selected in accordance with at least one light transmitting characteristic of at least one of the first fluid and the second fluid,
   such that an output difference, between an output of the detecting unit in the presence of light transmitted through the first fluid when the first fluid occupies the part of the optical path in the light transmitting unit and an output of the detecting unit in the presence of light transmitted through the second fluid when the second fluid occupies said part of the optical path in the light transmitting unit, exceeds a set value.

8. A device for detecting an interface between fluids according to claim 7, wherein the spectral intensity of the light source, the characteristics of the optical path from the light source to the detecting unit, and the spectral detection sensitivity characteristics of the detecting unit are set in accordance with the light transmitting characteristics of the first and the second fluids so as to limit light to be used in the detection of the interface to a wavelength band.

9. A device for detecting an interface between fluids according to claim 7, wherein a transmitted distance of light through the fluids along the part of the optical path from the light source to the detecting unit in the light transmitting unit is determined in accordance with the light transmitting characteristics of the first and the second fluids, the spectral intensity of the light source, the characteristics of the optical path from the light source to the detecting unit, and the spectral detection sensitivity characteristics of the detecting unit.

10. A device for detecting an interface between fluids according to claim 7, wherein the spectral intensity of the light source is changed in accordance with kinds of the first and the second fluids passing through the light transmitting unit.

11. A device for detecting an interface between fluids according to claim 8, wherein the wavelength band of the light to be used in the detection of the interface is changed in accordance with kinds of the first and the second fluids passing through the light transmitting unit.

12. A device for detecting an interface between fluids according to claim 9, wherein transmitted distances of light through the fluids along the part of the optical path from the light source to the detecting unit in the light transmitting unit is changed in accordance with kinds of the first and the second fluids passing through the light transmitting unit.

13. A device for detecting an interface between fluids according to claim 7, wherein the light from the light source is led to the light transmitting unit through an optical fiber.

14. A device for detecting an interface between fluids according to claim 7, wherein the light from the light transmitting unit is led to the detecting unit through an optical fiber.

15. A device for detecting an interface between fluids according to claim 7, wherein there are provided one optical fiber connected to the light transmitting unit, and light branch means for leading the light from the light source to the light transmitting unit through said one optical fiber, and leading the light from the light transmitting unit to the detecting unit through said one optical fiber.

16. A device for detecting an interface between fluids according to claim 15, wherein the light branch means comprises a collimator lens connected to an end of said one optical fiber which is not connected to the light transmitted unit, and a half mirror for splitting the light from the collimator lens.

17. A device for detecting an interface between fluids according to claim 15, wherein the light branch means comprises a pair of rod lens connected to each other with the axes aligned with each other and with a semi-transparent film provided therebetween.

18. A device for detecting an interface between fluids according to claim 9, wherein the light transmitting unit includes a chamber formed at a set part of a pipe for the first and second fluids to pass through.

19. A device for detecting an interface between fluids according to claim 18, wherein the chamber is formed by welding a cylindrical metal member to the set part of the pipe perpendicularly thereto.

20. A device for detecting an interface between fluids according to claim 18, wherein there are provided light applying means for guiding the light from the light source into the chamber, and light receiving means for guiding the light from the light applying means outside of the chamber.

21. A device for detecting an interface between fluids according to claim 20, wherein the chamber comprises the cylindrical metal member welded to the set part of the pipe perpendicularly to the set part, and a first and a second seal members secured to both ends of the metal member opposed to each other for sealing the chamber.

22. A device for detecting an interface between fluids according to claim 21, wherein the light applying means and the light detecting means are provided on the first seal member.

23. A device for detecting an interface between fluids according to claim 22, wherein a corner cube is provided on the second seal member, and the light from the light applying means is reflected on the corner cube to the light receiving means.

24. A device for detecting an interface between fluids according to claim 22, wherein the light applying means and the light receiving means are formed in a one-piece glass member; a reflecting mirror is provided on the second seal member; the light from the glass member is reflected on the reflecting mirror back to the glass member.

25. A device for detecting an interface between fluids according to claim 22, wherein the light applying means and the light receiving means are formed in a one-piece glass member; reflecting means including a reflecting mirror and a light guide is provided on the first seal member; and the light from the glass member is reflected on the reflecting means back to the glass member.

26. A device for detecting an interface between fluids according to claim 21, wherein the light applying means is provided on the first seal member; and the light receiving means is provided on the second seal member.

27. A device for detecting an interface between fluids according to claim 22, wherein the light applying means includes a plurality of glass members for leading light,
the light receiving means includes a plurality of glass members for receiving light,
the light from the respective glass members for leading light is guided to their respective associated ones of the glass members for receiving light, and
gaps between the glass members for leading light and their respective associated ones of the glass members for receiving light are set at different values.

28. A device for detecting an interface between fluids according to claim 21, wherein the light applying means comprises a cylindrical space formed in either of the first and the second seal members, and optical means for guiding the light from the cylindrical space into the chamber.

29. A device for detecting an interface between fluids according to claim 21, wherein the light receiving means comprises a cylindrical space formed in either of the first and the second seal members, and optical means for guiding the light from the chamber to the cylindrical space.

30. A device for detecting an interface between fluids according to claim 28, wherein the first and the second seal members are formed of glass which transmits the light from the light source; the optical means includes a projection formed on the inside surface of either of the first and the second seal members; and the projection has a reflecting mirror for deflecting light sealed in.

31. A device for detecting an interface between fluids according to claim 29, wherein the first and the second seal members are formed of glass which transmit the light from the light source; the optical means includes a projection formed on the inside surface of either of the first and the second seal members; and the projection has a reflecting mirror for deflecting light sealed in.

32. A method for detecting an interface between a first fluid and a second fluid in a light transmitting unit, comprising the steps of:
preparing a light source and a detecting unit being placed so as to form an optical path in a light transmitting unit of a pipe in communication with a vessel containing a first fluid and a second fluid with an interface, setting a spectral intensity of the light source, at least one characteristic of an optical path from the light source to the detecting unit, and spectral detection sensitivity of the detecting unit so that an output difference between a first output and a second output exceeds a predetermined value, the first output being of the detecting unit as the first fluid exists in the optical path in the light transmitting unit, and the second output being of the detecting unit as the second fluid exists in the optical path in the light transmitting unit, detecting the interface between the first fluid and the second fluid by monitoring a deflection of an output of the detecting unit.

33. A device for detecting an interface of two fluids, the device comprising:

a pipe having a light transmitting unit, the pipe being in communication with a vessel, the vessel containing a first fluid and a second fluid with an interface;

a light source for supplying a light to the light transmitting unit; and a detecting unit for detecting an intensity change of the light in the light transmitting unit from the light source;

whereby a spectral intensity of the light source, at least one characteristic of the optical path between the light source and the detecting unit, and spectral detection sensitivity of the detecting unit are selected in accordance with light transmitting characteristics of the first fluid and the second fluid in a manner that an output difference between a first output and a second output exceeds a predetermined value, the first output being of the detecting unit as the first fluid exists in the optical path in the light transmitting unit, and the second output being of the detecting unit as the second fluid exists in the optical path in the light transmitting unit.

34. A method for setting parameters in a detection process that detects an interface between a first and second fluid comprising the steps of (a) determining at least one parameter of said detection process as a function of at least one of the first fluid and the second fluid;

(b) transmitting light along an optical path, wherein a part of the optical path is alternatively occupied by each of the fluids;

(c) detecting light transmitted along the optical path under a first condition in which the first fluid occupies a part of the optical path and under a second condition in which the second fluid occupies the part of the optical path; and (d) recognizing an interface as a function of a change in light detected, whereby the light transmitted under the second condition differs sufficiently from the light transmitted under the first condition so that the change in light is distinguishable.

35. A method as in claim 34, wherein:

the step (c) of detecting includes generating a first signal indicative of light transmitted under the first condition, and generating a second signal indicative of light transmitted under the second condition; and wherein the step (d) of recognizing includes recognizing an interface as a function of the first and second signals, whereby the second signal differs sufficiently from the first signal so that the change is distinguishable.

36. A method as in claim 35, wherein:

the step (d) of recognizing includes comparing the function of the first and second signals with a reference value, whereby the function is distinguishable from the reference.

37. A method as in claim 34, wherein:

the parameter is spectral intensity of a light source.

38. A method as in claim 34, wherein:

the parameter is a characteristic of the optical path, the optical path running from a light source to a detecting unit.

39. A method as in claim 34, wherein:

the parameter is spectral detection sensitivity of a detecting unit.

40. A method as in claim 34, wherein:

the parameter is a wavelength bandwidth of the light.

41. A method as in claim 34, wherein:

the parameter is a transmission distance of light along the optical path.

42. A method as in claim 34, wherein:

the plane of the interface between the fluids and said optical path are substantially parallel.

43. An apparatus as in claim 7, wherein the light transmitting unit:

is formed in a light transmitting section of pipe through which the interface between the two fluids will pass, the section having at least one optical entrance of the light at an entrance position and at least one optical exit at an exit position in a wall of the pipe, the light traveling from the entrance position to the exit position.

44. An apparatus as in claim 43, wherein:

the entrance position and the exit position define a chord relative to a circumference of the pipe.

45. An apparatus as in claim 44, wherein:

the chord defines a diameter relative to the circumference.

46. An apparatus as in claim 43, wherein:

the light transmitting unit includes an intermediate reflector; and the entrance position and exit position are arranged so that light traveling from the entrance to the exit is reflected off the intermediate reflector, such that a path from the entrance to the intermediate reflector to the exit defines at least two chords, each relative to a circumference of the pipe.

47. An apparatus as in claim 46, wherein:

each chord is a diameter relative to the circumference.

48. An apparatus as in claim 47, wherein:

the entrance position is substantially the same as the exit position, thereby causing a path from the entrance position to the intermediate reflector to be substantially the same as a path from the intermediate reflector to the exit position, and the diameters defined to be substantially the same.

49. An apparatus as in claim 43 wherein:

the light transmitting section has at least a first and second optical entrance with corresponding entrance positions and at least a first and second corresponding optical exit with corresponding exit positions.

50. An apparatus as in claim 49, wherein:
a first entrance position and corresponding exit position define a first chord and a second entrance position and corresponding exit position define a second chord,
the first and second chords being of differing lengths.

* * * * *